United States Patent
Courdier et al.

(10) Patent No.: US 6,703,804 B1
(45) Date of Patent: Mar. 9, 2004

(54) METHOD FOR CONTROLLING A MOTOR VEHICLE WIPER

(75) Inventors: Paul Courdier, Mettray (FR); Phillipe Gougeon, Mignaloux (FR)

(73) Assignee: Valeo Systemes d'Essuyage (FR)

( * ) Notice: Subject to any disclaimer, the term of this patent is extended or adjusted under 35 U.S.C. 154(b) by 0 days.

(21) Appl. No.: 09/830,692

(22) PCT Filed: Oct. 29, 1999

(86) PCT No.: PCT/FR99/02657

§ 371 (c)(1),
(2), (4) Date: Jun. 27, 2001

(87) PCT Pub. No.: WO00/26069

PCT Pub. Date: May 11, 2000

(30) Foreign Application Priority Data

Oct. 29, 1998 (FR) .............................................. 98 13578

(51) Int. Cl.[7] .............................. H02P 3/00; H02P 7/00
(52) U.S. Cl. ........................ 318/445; 318/280; 318/282; 318/283; 318/430; 318/432; 318/443; 318/444; 318/DIG. 2
(58) Field of Search ................................ 318/139, 443, 318/444, 280, 282, 283, DIG. 2, 430, 432, 445

(56) References Cited

U.S. PATENT DOCUMENTS

| | | | | |
|---|---|---|---|---|
| 4,542,325 A | * | 9/1985 | Kobayashi et al. ......... | 318/483 |
| 5,412,296 A | * | 5/1995 | Cien et al. ................... | 318/444 |
| 5,568,026 A | * | 10/1996 | Welch .......................... | 318/443 |
| RE35,422 E | * | 1/1997 | Levers ......................... | 318/444 |
| 5,654,617 A | * | 8/1997 | Mills ........................... | 318/444 |
| 5,694,012 A | * | 12/1997 | Pientka et al. .............. | 318/444 |
| 5,757,155 A | * | 5/1998 | Autran et al. ............... | 318/443 |
| 5,818,187 A | * | 10/1998 | Savage et al. .............. | 318/443 |
| 6,078,056 A | * | 6/2000 | Teder .......................... | 250/574 |
| 6,140,785 A | * | 10/2000 | Hogler ........................ | 318/282 |
| 6,218,741 B1 | * | 4/2001 | Braun et al. ................ | 307/10.1 |
| 6,281,649 B1 | * | 8/2001 | Ouellette et al. ........... | 318/443 |

FOREIGN PATENT DOCUMENTS

| | | | | |
|---|---|---|---|---|
| DE | 34 41 842 | | 5/1986 | |
| DE | WO9906251 A1 | * | 2/1999 | ............. B60S/1/08 |
| FR | 2 736 023 | | 1/1997 | |
| WO | WO98 29285 | | 7/1998 | |

* cited by examiner

Primary Examiner—Robert Nappi
Assistant Examiner—Tyrone Smith
(74) Attorney, Agent, or Firm—J. Gordon Lewis

(57) ABSTRACT

The invention concerns a method for controlling a motor vehicle wiper motor comprising steps which consist in: determining at least a range related to an operating parameter of the motor and capable of having several non null values; comparing said range with a predetermined threshold (high LS, low; HS, high INT, low LS, low INT); and controlling the motor on the basis of the result of the comparison. The range is determined when the rotor of the motor occupies a determining position corresponding to a predetermined point on a trajectory of a blade driven by the motor.

26 Claims, 3 Drawing Sheets

METHOD FOR CONTROLLING A MOTOR VEHICLE WIPER

BACKGROUND OF THE INVENTION

This invention concerns the control of a motor vehicle wiper.

It is common knowledge to command the wiper system from the dashboard by means of a system allowing one to choose different modes of operation: stop, high speed, low speed, and intermittent. The choice of these modes depends on the quantity of water on the windshield of the vehicle, which is itself a function of a number of elements, the main ones being the intensity of the rain and the flux of air generated by the movement of the vehicle. The change of these conditions, notably the first, is sometimes very progressive and imperceptible such that the driver, whose attention is first and foremost focused on the driving of the vehicle does not always think of the opportune moment to change the mode of operation of the wiper system for the new conditions. One hopes to put in place a system helping wholly or partially the driver in controlling the wiping device, most of the systems proposed until the present have not given full satisfaction.

SUMMARY OF THE INVENTION

A goal of this invention is to furnish a system performing control of the wiper.

In order to achieve this goal, this invention conceives of a method for controlling a motor vehicle wiper motor comprising steps which consist of determining at least a range related to an operating parameter of the motor and capable of having several non null values, comparing the range with a predetermined threshold, and controlling the motor on the basis of the result of the comparison, in which the range is determined when the rotor of the motor occupies a determining position corresponding to a predetermined point on a trajectory of a blade driven by the motor.

Thus, the determination of the range while the blade is in a predetermined position of its trajectory makes this determination particularly pertinent and, in addition, reproducible. The control of the motor that as a result is thus also pertinent, reproducible and reliable. By comparison, the measure of the range on the entire trajectory of the blade and the calculation of the corresponding average would be of little pertinence, or even misleading. For example, in the course of the trajectory of the blade, the wind sometimes pushes the blade, sometimes to help it. The calculation of an average can thus make the influence of the wind undetectable. The control decision that would follow would thus not be pertinent.

Advantageously, the motor would be linked to the blade via a connecting rod, the point being in a quasi-linear zone on the basis of transfer from the connecting rod. Thus, the determination of the range is particularly pertinent.

The parameter can comprise the intensity of an electric current supply from the motor.

In effect, this range is directly correlated to the speed of the motor. Also knowing this range, one can compare it to a consigned value or a threshold and control, as necessary, a modification of the operation of the motor such as a modification of motor speed.

The parameter can also include a speed of the motor and/or a position of the rotor of the motor.

Advantageously, the range is an average of several values of the parameters.

One thus avoids giving too much importance to an untimely abrupt variation in the form of a peak.

Advantageously, one will make comparisons of the range with a predetermined lower and upper threshold and the motor is controlled on the basis of these comparisons. Thus, one can control a change in the mode of the motor operation.

Advantageously, the motor will be constructed in order to operate following at least two methods of operation associated to the intervals of different speeds and/or to the different procedures, at least one of the lower and upper thresholds being predetermined on the basis of the current mode of operation of the motor.

Advantageously, one determines the range while a rotor of the motor has a rotational direction corresponding to movement in a predetermined direction on a trajectory of a blade driven by the motor.

Advantageously, the movement direction is such that the blade moves towards the bottom of a windshield of the vehicle.

Thus, in this sense, the blade moves in a direction opposite to the flux of air generated by the displacement of the vehicle moving forward. This performance of the blade is thus more representative of the conditions of the windshield than in the other direction.

Advantageously, one controls the motor on the basis of data given by a wiper control instrument accessible to the driver of the vehicle.

Following the chosen configuration for the system, one will choose the order of priority attached to each mode to an order coming from such a control instrument.

Advantageously, one controls the motor on the basis of a data given by a rain sensor. However, preferably, the rain sensor will only operate in conjunction with the starting of the motor.

Advantageously, one controls the motor on the basis of representative data of the speed of the vehicle.

Advantageously, one controls two vehicle wiper motors, and the system comprising steps which consist of determining two positions of rotors respective to the motors, in order to create a comparison of the positions between them and/or the comparisons of the positions with the thresholds of predetermined respective position, and to control at least one of the motors on the basis of a result of the comparison and/or the results of the comparisons.

Without requiring a mechanical link between the blades, one assures a control of the synchronization of their movements, which is important when the blades are associated to the same windshield and have secant trajectories.

Advantageously, when the parameter is the electric voltage to the motor terminals, one creates a comparison of the range with a predetermined saturation threshold, and one controls a stop of the motor on the basis of a result of the comparison.

One has thus conceived of a wiper motor interruption resulting from a blockage of the blade.

Advantageously, one controls the restarting of the motor after a predetermined interval of time.

Advantageously, the control step includes the modification of a motor speed.

Advantageously, the motor is constructed in order to function following at least two methods of operation associated to the different speed range and/or to the different processes, the control step including the ability to modify a motor speed, and eventually, to change the current mode of operation of the motor.

Advantageously, one controls the motor while a rotor of the motor occupies a control position corresponding to a predetermined point on a trajectory of a blade driven by the motor.

Advantageously, the point is an end of the trajectory of the blade.

Advantageously, one controls the motor in such a way that, for a course of a blade driven by the motor in only one direction from a first end to a second end of the course, the motor has first a constant speed on a first, larger part of the course, then a second constant speed, lower than the first speed on a second part of the course following the first part and preceding the second end.

The invention also conceives a control device of a motor vehicle wiper motor including means for determining at least a range linked to a operating parameter of the motor and capable of having several non null values, means for comparing the range with a predetermined threshold, means for controlling the motor on the basis of the result of the comparison, in which the determination means are constructed in order to determine the range while a rotor of the motor occupies at least one position corresponding to a predetermined point on a trajectory of a blade driven by the motor.

The invention also conceives a reduction motor for a motor vehicle wiper, including a control device according to the invention.

BRIEF DESCRIPTION OF THE DRAWING

Other characteristics and advantages of the invention will appear in the following description of a preferred method of production and of variations given by way of non-limiting examples. In the attached drawings.

DETAILED DESCRIPTION

Figure 1:
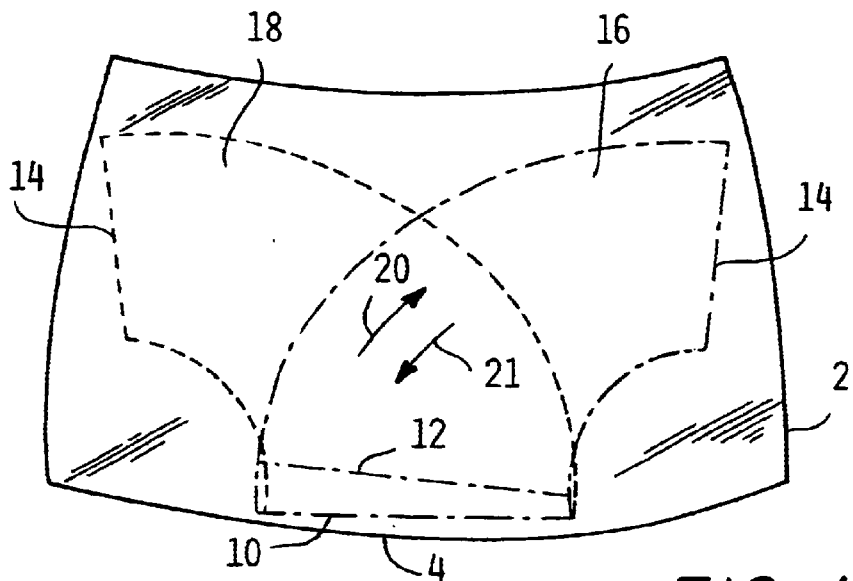
FIG. 1 is a view of a windshield with the trajectory of the wiper blades.

One is going to describe a method of implementation of the process according to the invention, used for the control of two wiper blades of the front windshield on a motor vehicle. The function of this process is to maintain, in all circumstances, the transparency of the front windshield 2 of the vehicle. The process assures the control of two similar subsets associated with two mobile blades on the windshield. The wiping is of an opposing type already known. The blades are moved around two points situated near a lower edge 4 of the windshield 2. Each subset includes a reduction motor made up of a motor 5 and a reductor, a connecting rod transmitting the movement generated by the wiper motor 5, and control electronics 6 or CPU controlling the supply module of electronic current or power module 8 of the motor. The reduction motor and the connecting rod are already understood. The CPU module 6 and the power module 8 are of a classic type in other contexts causing intervention of an electronic control of the motor. The two subsets each have here a mechanical connection one to the other, apart from each of their fixations to the vehicle body.

In each subset, the movement of the blade on the windshield is obtained from a continuous rotational movement of a rotor of the motor to help the controlling rod which assures the changing of the direction of the rotation of the blade at the ends of its trajectory. The controlling rods are different from each other only in the configuration of the connecting rods and starting handles that make them up.

They assure in principle, in order to always turn the motors at the same angular speed, the non-collision of the blades on the windshield. However, as one will see, the system conceives an electronic surveillance of this synchronization. Each subset includes a plate serving as support at the radiator at the motor 5, at the power module 8, at the CPU 6 and at the controlling rod.

In reference to FIG. 1, one illustrates the respective trajectories of the two blades. One distinguishes between several individual positions of each blade:

position 10 resting stop (RS): cleaning position;
position 12 fixed stop (FS);
position 14 opposite of fixed stop (OFS): the blades are at the maximum clearance, generally at the top part of the windshield.

The driver's side was marked by 16, thus the passenger side is reference number 18.

The trajectory of each blade includes an ascending path or outgoing wipe 20 during the course of which the blade displaces from position FS to position OFS, and a descending path or return wipe 21, from position OFS to position FS.

The wiper system is controllable notably from the dashboard of the vehicle via a classic control instrument of the switch type 23. The switch 23 allows, in a known manner, to choose different modes of operation of the wiper system:

high speed mode or HS, during which the blades wipe the windshield at a high speed and come and go without any perceptible pause;

low speed or LS, during which the blades wipe the windshield at a low speed and come and go without any perceptible pause. The terms "high speed" and "low speed" are to be understood in relation to each other: at each of these modes an assigned speed value as well as a range of admissible values for the speed of the blade (or of the motor). These two ranges are disjointed;

intermittent or INT, during which the blades wipe the windshield at low speed, coming and going by displaying a perceptible pause of several tenths of a second between each come and go; and stop.

The present system allows in addition the selection, with the switch 23, of an automatic mode in which the driver relies entirely on the CPU 6 for the control of the system, without imposing a preferred mode.

While one of these modes HS, LS or INT is selected by the switch 23, the CPU 6 applies this mode as default but modifies the speed and/or the mode of operation if necessary.

Figure 2:
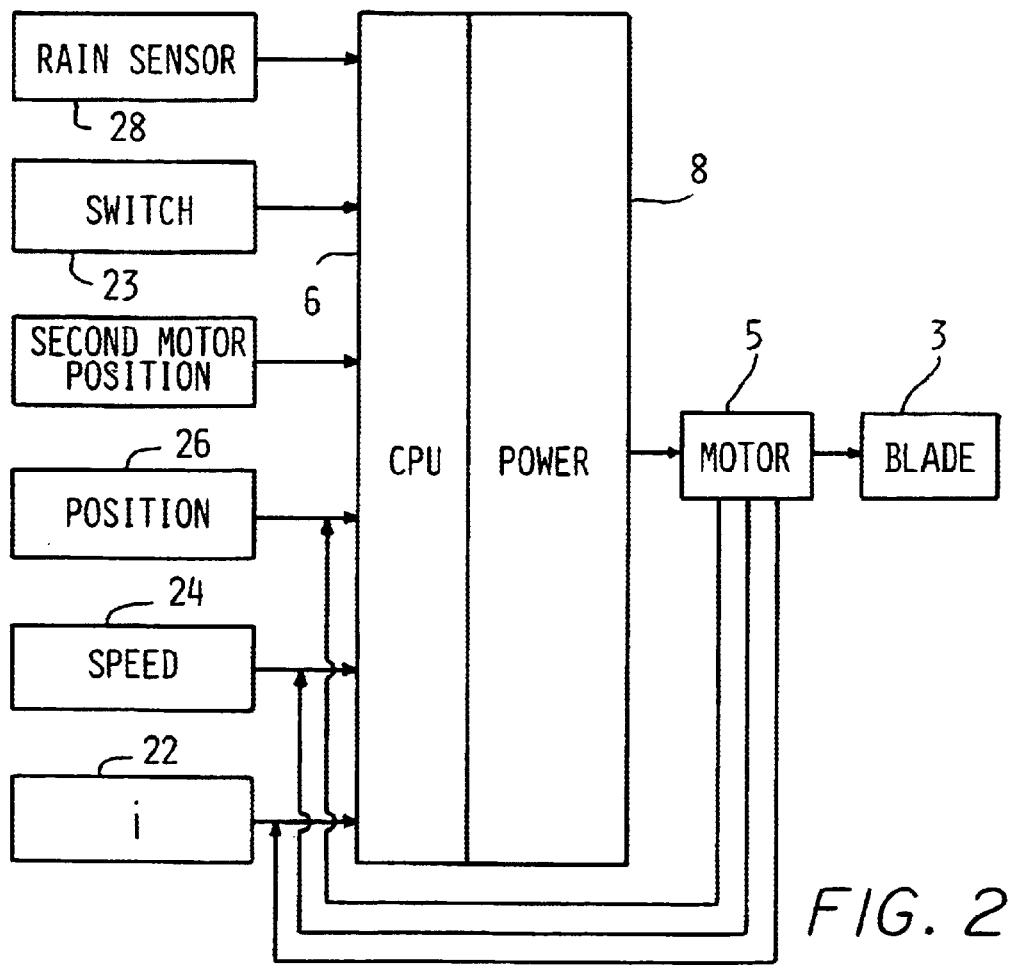
FIG. 2 is a diagram of the principal organization of the control system according to the invention.

The electronic module 6 comprises known means 22 in order to, via derivation, measure the magnitude of an electronic current supplying the motor 5 and to calculate an average of the measures of current magnitude over a predetermined period of time. The current magnitude is generally directly related to the rotational speed of the rotor of the motor 5. Understanding the magnitude will thus provide the means to precisely know the speed of the motor and that of the associated blade. Alternatively or simultaneously, one can conceive the measuring of the speed of the rotor via a known speed sensor 24. These two means, relatively redundant, are illustrated in FIG. 2. The electronic module 6 is also associated to a Hall effect sensor 26 instantly marking the position of the rotor around its axis of rotation.

The means of measuring the current magnitude 22, the speed 24, and the position 26 are linked to the CPU 6 from each respective servo control loops, which are entirely numerical of the known PID type. The motor 5 is thus controlled in speed and position. In the present method of production, one gives priority to the servo control of speed over servo control of position.

One is now going to describe more details of the servo control of the speed. The CPU 6 is programmed to measure the intensity of the current for a predetermined interval of time, then find the average of these measures. This time interval has a duration of, for example, several milliseconds. This measure takes place at each pass, come and go, of the wiper in order to control the speed of the blade during the following come and go. The time interval chosen here corresponds to a position of the rotor around its axis which corresponds to the descending path 21 of the blade with the blade situated approximately in the middle of its path from position OFS (which it just left) and position FS (towards which it is moving). This point on the trajectory of the blade is chosen for the following reasons: the trajectory begin descending, the blade is moving in the direction opposite to the flux of air generated by the speed of the vehicle. In addition, the point at mid-path corresponds, traditionally, to a part on the basis of transfer from the connecting rod which is linear.

Figure 3:
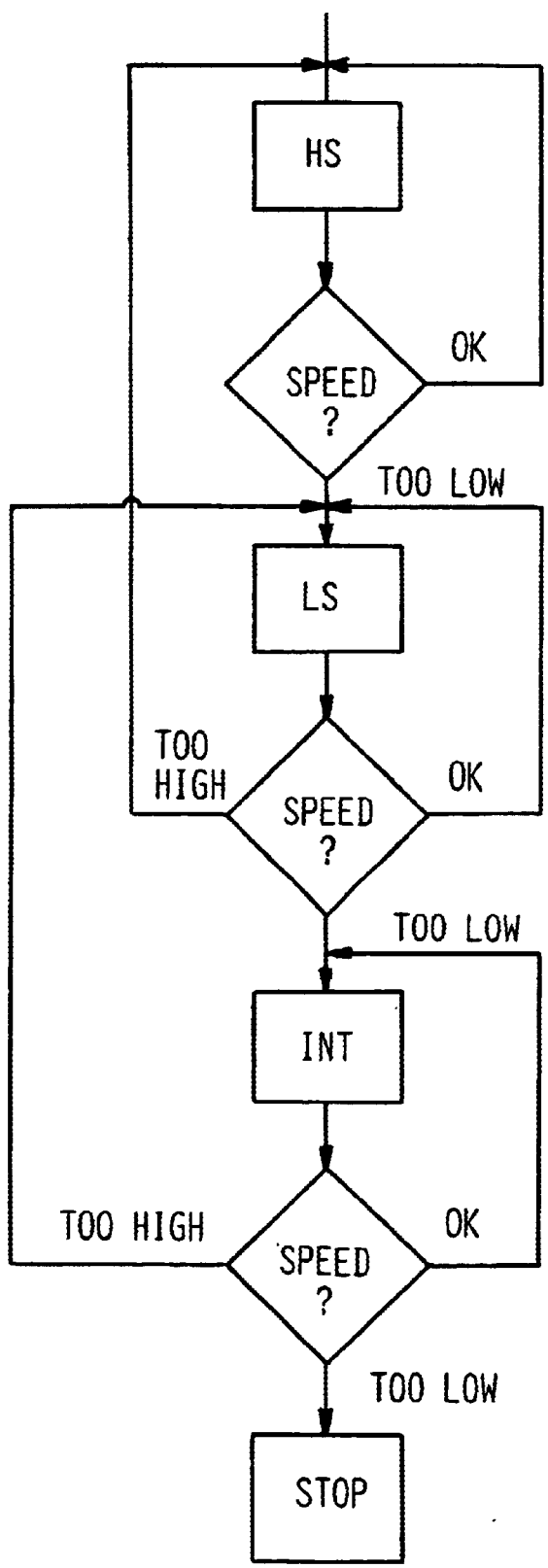
FIG. 3 is a flowchart showing the control of the changes in mode.

The servo control of the speed includes the thresholds associated to the respective operation modes. The thresholds here define the ranges of different slightly overlapped speeds. In addition, an HS mode is associated with a low HS threshold. An LS mode is associated with a high LS threshold and a low LS threshold. An TNT mode is associated with a high INT threshold and a low INT threshold. And one has:

High LS threshold>low HS threshold>high INT threshold>low LS threshold>low INT threshold Faced with a current operational system (that is to say one in progress), the system assures a servo control of the speed in order to cause the tendency to maintain the speed of the motor (and of the blade) at the assigned value of speed corresponding to the current mode. On the other hand, as one has seen, the system obtains, at each come and go, an average value of actual speed. It thus compares this value to the cited threshold or thresholds associated to the current mode. If the value surpasses one of these thresholds, this signifies that the speed of the blade is not correctly adapted to the window conditions associated with the movement of the blade on the windshield. For example, if the blade's speed is too high, this signifies that the quantity of water on the windshield is significant and/or the flux of air generated by the movement of the vehicle is not significant. On the contrary, if the blade's speed is too slow, it is likely that the quantity of water is slight and generating significant friction between the blade and the window, or that the flux of air is very significant and slowing the blade. The system then decides to modify the current mode in the direction associated with the broken threshold. Thus, if in LS mode, the speed value is lower than the low LS threshold, the system chooses INT mode as the current mode. Oppositely, if the speed value is above the high LS threshold, the system chooses HS mode. If the speed value does not break the threshold or thresholds associated with the current mode, the system does not change the current mode and simply adjusts the speed. This operation of the system is illustrated in the flowchart on FIG. 3.

While the system makes such a mode change, it waits until the blades are in the position opposite from fixed stop (OFS) in order to not disturb the regularity of the movement of the blades seen by the driver.

The system includes in addition a rain sensor 28 of a known type including a means of detecting the presence of rain on the vehicle. This sensor can be associated to the system in a manner to initiate the start of the wiper motors and/or their stop when the rain stops.

The system also controls the synchronization of the movements of the two motors (and two blades). In effect, as illustrated on FIG. 2, the CPU associated with each wiper motor regularly receives information on the position of the rotor of the other motor, which corresponds to a certain position of the second blade. The system can therefore be conceived in order to compare the positions of the two rotors and figure out if there is a risk of collision between the two blades. However, while the information on the positions of the two rotors can be received very frequently, for example, every 3.5 milliseconds, it suffices to verify the conformity of the position of each rotor with a nominal or assigned value or corresponding to the instant of the measure. When the difference between the measured position and the exceeded order, by one of the rotors, a predetermined threshold, one orders a modification of the speed of the associated motor in order to compensate for this error in positioning.

In each subset, the system includes measuring means and/or calculation of the tension on the limits of the wiper motor 5. It is configured in order to determine at regular time intervals a tension value on the limits. During the surveillance of the tension of the motor, one compares at regular time intervals, the values of the current tension with a predetermined saturation threshold of such a type that when the tension reaches the threshold, this signifies that the motor is blocked. If this is the case, the system receives a stop of the motor concerned, or even both motors. The system can be configured to, in these conditions, order a restarting of the motor at regular time intervals, for example every 5 seconds. This is particularly useful when the origin of the blockage is untimely and temporary, for example an obstacle in the trajectory of the blade. Then, the system protects itself from destruction of its motors as if thermo protection was integrated into the motor.

One can also conceive that, in a non-automatic operation, one stops the wiping when the average speed of the movement is lower than a threshold during a time greater than a given duration. The system then restarts in a cyclical fashion, with a definite period of repetition.

One can conceive that, in the case of a blockage detected at the beginning of a wiping phase, in FS position, the system looks to restart in a cyclical fashion, with the same period of repetition. In the case of a blockage during wiping, the system proceeds in two ways: it tries to restart normal wiping, from the positions of the motors eventually stalling; if the blockage reappears during the same cycle or the following cycle, one moves to a predetermined damaged mode.

Apart from the control of the mode changes or the speed changes connected to the changing conditions of the window, the system is also conceived in order to control the speed of the motor following the position of the blade on its trajectory, independent of an eventual change of conditions of the window. Notably, it controls the motor in such a way that the blade slows down as it approaches each end position FS or OFS of each course of its trajectory. More precisely, the blade has a first constant speed on a larger median part of each course, then a second constant speed, lower than the first speed, on a following part of the course adjacent to the end position towards which it is moving.

Figure 4:
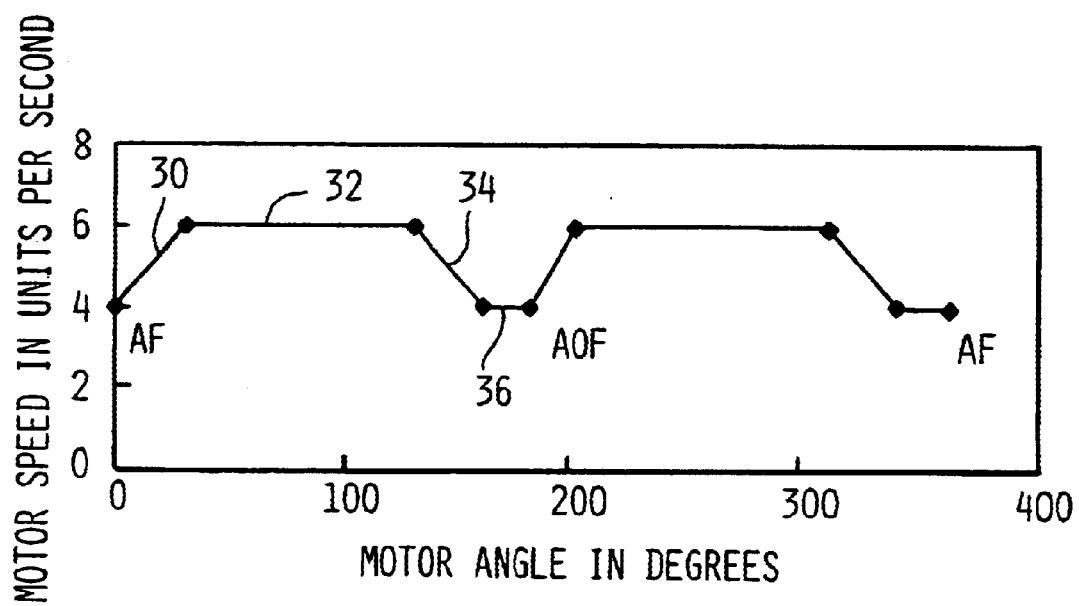
FIG. 4 is a curve illustrating the speed of the rotor on the basis of its angular position.

This mode of operation is illustrated on FIG. 4 on a 360° cycle of the motor corresponding to a come and go course of the blade. The ascending path 20 of the blade begins from the fixed stop position FS via a phase 30 of constant acceleration, followed by a phase 32 of the first speed, then a phase 34 of constant deceleration and a phase 36 of the second speed until position OFS. The same succession is reproduced for the descending path 21 towards the FS position. This control process eliminates or reduces surpassing the FS and OFS positions at the ends of the trajectory, frequent in the older models, notably when the window is wet. This control principle allows limitation of surpassing of angles of 1.5° at each end. While returning, one can also reach the maximum of the nominal wiping zone.

If need be, the system can also receive orders from a computer on board the vehicle or body controller and be responsible for the control of the blades.

In this case, from the analog sensor position, the CPU assures all the calculations of the servo control of the motor and generates the controls under the form PWM of the power module 8.

In normal operation, only one rotational direction is authorized by the motor.

As one has seen, the surveillance assures:
- the non collision of the blades by sampling their position sufficiently frequently and by comparing the differential of the errors in relation to the nominal of each of the blades;
- regulation of the average wiping speed in order to limit the non-cyclical phenomenon;
- automatic passage between HS, LS, INTERMITTENT, and STOP modes looking to choose the requested mode from the switch; and
- the protection of the system against the overload that can drive its destruction.

A cleaning position of the blades is defined by two values of angle of the motors, not necessarily coinciding with the nominal trajectories. This position is achieved when the stoppage of wiping, in stop mode, and during stops during intermittent wiping, without discontinuity in the movement of the blades.

The two modules 6 communicate with each other in order to exchange all the necessary information to the regulation, to the decoding of information from the switch 23, from the body-controller or from the rain sensor 28. In addition to this connection, on can conceive that each CPU receives from the opposite CPU:
- a copy of the position of the sensor, in order to verify the integrity of the communication between the CPUs;
- an order making it return when there is a detection of a malfunction;
- an order from the power step allowing the control of the rotation in order to free the collision zone, and to operate in a damaged mode; and/or
- a supply allowing the operation of the sensor connected at a distance, and the rotation of the motor in damaged mode.

A certain amount of data can be downloaded on a chain connection in the CPU and vehicle operation. It is made up of, for example, the following data:
- nominal HS rotational speed;
- nominal LS rotational speed;
- speed before returning;
- position of the slowing down of the ascending wiping;
- position of the slowing down of the returning wiping;
- resting position RS; and
- intermittent interval.

One can conceive that in the course of the control, the system receives data on the speed of the vehicle's movement and takes it into account in order to control the wiper.

What is claimed is:

1. A control process for a motor of a wiper blade of a motor vehicles the motor controlling movement of the blade over a cycle the cycle including movement of the blade from one of a top of a windshield and a bottom of the windshield to the other of top of the windshield and the bottom of the windshield and back, the control process comprising the steps of:
    sampling a value related to an operating parameter of the motor at least once during a cycle of the blade, the sampling step consistently occurring during the cycle of the blade when the blade moves towards only one of the bottom of the windshield and the top of the windshield,
    comparing at least one sample obtained in the sampling step with a predetermined threshold of the operating parameter, and
    controlling the motor based upon a result of the comparing step.

2. The control process according to claim 1, wherein the motor is attached to the blade via a controlling rod.

3. The control process according to claim 1, wherein the operating parameter is a magnitude of an electric current supply of the motor.

4. The control process according to claim 1, wherein the operating parameter is a speed of the motor.

5. The control process according to claim 1, wherein the operating parameter is a position of a rotor of the motor.

6. The control process according to claim 1, wherein sampling step comprises the step of sampling several values of the operating parameter and wherein the comparing step compares an average of the several values of the operating parameter to the predetermined threshold.

7. A control process for a motor of a wiper blade of a motor vehicle, he motor controlling movement of the blade over a cycle, the cycle including movement of the blade from one of a top of a windshield and a bottom of the windshield to the other of top of the windshield and the bottom of the windshield and back the control process comprising the steps of
    sampling a value related to an operating parameter of the motor at least once during a cycle of the blade, the sampling step consistently occurring when the blade moves towards only one of the bottom of the windshield and the top of the windshield,
    comparing at least one sample obtained in the sampling step with a predetermined threshold of the operating parameter,
    controlling the motor based upon a result of the comparing step wherein the comparing step comprises the step of comparing an average of several samples obtained in the sampling step with at least one of a lower threshold and an upper threshold, the lower threshold and the upper threshold based upon an signal mode of operation of the motor, the control process further comprising the step of:
    changing the existing mode of operation to a new mode of operation when the average is one of lower than the lower threshold and higher than the upper threshold.

8. The control process according to claim 1, wherein the motor operates in at least two modes of operation, each mode of operation associated with at least one of a different target speed and a different timing procedure, the control process further comprising the step of:

selecting at least one of a lower threshold and an upper threshold for use in the comparing step based upon an existing mode of operation of the motor.

9. The control process according to claim 1, wherein the controlling step further comprises the step of controlling the motor on the basis of data furnished by a control instrument of the wiper, the control instrument accessible to the driver of the vehicle.

10. The control process according to claim 1, wherein the controlling step further comprises the step of controlling the motor on the basis of data furnished by a rain sensor.

11. The control process according to claim 1, wherein the controlling step further comprises the step of controlling the motor on the basis of data representative of a speed of the vehicle.

12. The control process according to claim 1, further comprising the steps of:
performing the sampling step and the comparing step for two motors of respective wiper blades, wherein the operating parameter is other than the positions of rotors of the respective motors;
sampling a position of each rotor of the respective motors at least once during the cycle; and
comparing each of the positions with a respective predetermined position; and wherein the controlling step fix comprises the step of controlling at least one of the motors based upon at least one of a result of comparing the at least one sample obtained in the sampling step with the predetermined threshold of the operating parameter for the at least one of the motors and a result of comparing each of the positions with its respective predetermined position.

13. A control process of a motor of a vehicle wiper, comprising the steps of:
determining at least a range related to an operating parameter of the motor, the range capable of having several non null values and the parameter being an electric tension of the motor limits;
comparing the range with a predetermined saturation threshold, and
controlling the motor on the basis of the result of the comparison, characterized by determining the range when a rotor of the motor occupies at least a determining position corresponding to a predetermined point on a trajectory of a blade driven by the motor, and by controlling a stop of the motor on the basis of a result of the comparison.

14. The process according to claim 13, characterized by controlling a restart of the motor after a predetermined interval of time.

15. The control process according to claim 1, wherein the controlling step further comprises the step of modify a speed of the motor.

16. The control process according to claim 8, wherein the controlling step further comprises changing an existing mode of operation of the motor.

17. The control process according to claim 7 wherein the step of changing the existing mode of operation of the motor constantly occurs only at a predetermined control point in the cycle of the blade.

18. The control process according to claim 17, wherein the control point is a furthest point from a resting position in the cycle of the blade.

19. A control process of a motor of a vehicle wiper, comprising the steps of:
determining at least a range related to an operating parameter of the motor, the range capable of having several non null values;
comparing the range with a predetermined threshold; and
controlling the motor on the basis of the rest of the comparison, characterized by determining the range when a rotor of the motor occupies at least a determining position corresponding to a predetermined point on a trajectory of a blade driven by the motor and by controlling the motor in such a way that, for a course of a blade driven by the motor in only one direction of movement from a first end to a second end of the course, the motor has a first constant speed on a first larger part of the course, then a second constant speed lower than the first speed on a second part of course following the first part and preceding the second end.

20. A control device for a motor of a viper blade of a motor vehicle wherein movement of the blade occurs over a cycle, the cycle including movement of the blade from one of a top of a windshield and a bottom of the windshield to the other of top of the windshield and the bottom of the windshield and back, the control device comprising:
means for sampling a value related to an operating parameter of the motor at least once during a cycle of the blade, the sampling means consistently sampling during the cycle of the blade when the blade moves towards only one of the bottom of the windshield and the top of the windshield;
means for comparing at least one sample obtained by the sampling means with a predetermined threshold of the operating parameter; and
means for controlling the motor based upon a result from the comparing means.

21. A reduction motor for a motor vehicle viper, including a control device according to claim 20.

22. The control device for a motor vehicle wiper motor according to claim 20 wherein the operating parameter is a rotor position of the motor and the means for controlling the motor comprises means for changing the rotor position of the motor.

23. A control process for a motor of a wiper blade of a motor vehicle, the motor controlling movement of the blade over a cycle, the cycle including movement of the blade from one of a top of a windshield and a bottom of the windshield to the other of top of the windshield and the bottom of the windshield and back, the control process comprising the steps of:
sampling a value related to an operating parameter of the motor at least once during a cycle of the blade, the sampling step consistently occurring when the blade moves towards only one of the bottom of the windshield and the top of the windshield;
comparing at least one sample obtained in the sampling step with a predetermined threshold of the operating parameter;
controlling the motor based upon a result of the comparing step;
performing the sampling step and the comparing step for two motors of respective wiper blades, wherein the operating parameter is other than the positions of rotors of the respective motors;
sampling a position of each rotor of the respective motors at least once during the cycle; and
comparing each of the positions with a respective predetermined position; and wherein the controlling step further comprises the step of controlling at least one of the motors based upon at least one of a result of comparing the at least one sample obtained in the sampling step with the predetermined threshold of the operating parameter for the at least one of the motors and a result of comparing each of the positions with its respective predetermined position; and wherein the step of comparing each of the positions with a respective predetermined position results in respective error signals, and the step of controlling at least one of the motors based upon the result of comparing each of the positions with its respective predetermined position occurs only when at least one of the respective error signals is above a threshold value.

24. A control process for a motor of a wiper blade of a motor vehicle, the motor controlling movement of the blade over a cycle, the cycle including movement of the blade from one of a top of a windshield and a bottom of the windshield to the other of top of the windshield and the bottom of the windshield and back, the control process comprising the steps of:

sampling a value related to an operating parameter of the motor at least once during a cycle of the blade, the sampling step consistently occurring when the blade moves towards only one of the bottom of the windshield and the top of the windshield;

comparing at least one sample obtained in the sampling step with a predetermined threshold of the operating and controlling the motor based upon a result of the comparing step; and wherein the sampling step further comes the step of sampling an electric tension of the motor and the comparing step further comprises the step of comparing the at least one sample with a predetermined saturation threshold; and wherein the controlling step further comprises the step of stopping the motor when the comparing step shows that the at least one sample reaches the predetermined saturation threshold.

25. The control process according to claim 24, further comprising the step of:

restarting the motor after a predetermined interval of time passes from a motor stop.

26. The control process according to claim 1 wherein the controlling step further comprises the step of:

controlling the motor such that, for a course of the blade along a path of movement from one of the top of the windshield and the bottom of the windshield to the other of top of the windshield and the bottom of the windshield, the motor has a first constant speed on a first part of the path and a second constant speed lower than the first constant speed on a second part of the path.

* * * * *